(12) United States Patent
Tsukuda

(10) Patent No.: US 12,049,015 B2
(45) Date of Patent: Jul. 30, 2024

(54) SCREEN IMAGE TRANSITION INFORMATION GENERATION DEVICE, SCREEN IMAGE TRANSITION INFORMATION GENERATION METHOD, SCREEN IMAGE TRANSITION INFORMATION GENERATION PROGRAM, AND SCREEN IMAGE TRANSITION INFORMATION GENERATION SYSTEM

(71) Applicant: JAPAN NOVEL CORPORATION, Tokyo (JP)

(72) Inventor: Toyoaki Tsukuda, Tokyo (JP)

(73) Assignee: JAPAN NOVEL CORPORATION, Tokyo (JP)

( * ) Notice: Subject to any disclaimer, the term of this patent is extended or adjusted under 35 U.S.C. 154(b) by 326 days.

(21) Appl. No.: 17/626,491

(22) PCT Filed: Jun. 12, 2020

(86) PCT No.: PCT/JP2020/023239
§ 371 (c)(1),
(2) Date: Jan. 11, 2022

(87) PCT Pub. No.: WO2021/010069
PCT Pub. Date: Jan. 21, 2021

(65) Prior Publication Data
US 2022/0281115 A1   Sep. 8, 2022

(30) Foreign Application Priority Data

Jul. 12, 2019 (JP) .................. 2019-130016

(51) Int. Cl.
*B25J 9/16* (2006.01)
*G06F 3/04817* (2022.01)
*G06F 3/0482* (2013.01)
*G06F 3/0484* (2022.01)

(52) U.S. Cl.
CPC .......... *B25J 9/1697* (2013.01); *B25J 9/1664* (2013.01); *G06F 3/04817* (2013.01); *G06F 3/0482* (2013.01); *G06F 3/0484* (2013.01)

(58) Field of Classification Search
CPC ...... B25J 9/1697; B25J 9/1664; B25J 9/1679; G06F 3/04817; G06F 3/0482; G06F 3/0484
See application file for complete search history.

(56) References Cited

U.S. PATENT DOCUMENTS

2014/0309775 A1* 10/2014 Jenkinson ............... G01L 25/00
                                                          700/250
2020/0114504 A1*  4/2020 Chen ..................... G10L 15/26

FOREIGN PATENT DOCUMENTS

CN   101165423 A   4/2008
CN   102694948 A   9/2012
(Continued)

OTHER PUBLICATIONS

7Bot, 7Bot Desktop Arm, Screen captures from YouTube video "Desktop Arm automatically playing touch-screen game 'Hit Mouse'", 2 pages, uploaded Aug. 30, 2015 by user "@7Bot", Retrieved from Internet: <URL: https://www.youtube.com/watch?v=BmpCpqXJrvE> (Year: 2015).*

(Continued)

*Primary Examiner* — Jason Holloway
*Assistant Examiner* — Benjamin J Brosh
(74) *Attorney, Agent, or Firm* — KENEALY VAIDYA LLP

(57) ABSTRACT

A device to verify a screen image transition without manual intervention. The device includes: a screen image data acquisition unit which acquires image data of the screen image; a screen image transition button extraction unit which analyzes image data of the screen image and extracts a button in the screen; an operation target button selection (Continued)

unit which selects a button to be an operation target; a button operation unit which causes the device to generate a signal when the selected button is operated; a screen image transition recording unit which records screen image transition data in a recording medium, the data including image data of the screen images before and after the screen image transition caused by the operation, and data related to the button operated during the transition; and a screen image transition diagram generation unit which generates a screen image transition diagram using the screen image transition data.

9 Claims, 8 Drawing Sheets

(56) References Cited

FOREIGN PATENT DOCUMENTS

| CN | 102935288 A | | 2/2013 |
|---|---|---|---|
| JP | H10-198586 A | | 7/1998 |
| JP | 2002-182914 A | | 6/2002 |
| JP | 2008-140408 A | | 6/2008 |
| JP | 2010-079342 | * | 9/2008 |
| JP | 2010-079342 A | | 4/2010 |
| JP | 2012-248094 A | | 12/2012 |
| JP | 2012-248097 A | | 12/2012 |
| JP | 2014-235699 A | | 12/2014 |
| JP | 2016-048471 A | | 4/2016 |
| JP | 2019-004221 A | | 1/2019 |
| JP | 2019-032719 A | | 2/2019 |
| WO | 2013/157322 A1 | | 10/2013 |
| WO | 2021/010069 A1 | | 1/2021 |

OTHER PUBLICATIONS

Japanese Office Action for the related Japanese Patent Application No. 2019-130016 dated Sep. 13, 2022.
Chinese Office Action for the related Chinese Patent Application No. 202080050612.5 dated Oct. 30, 2023.
Indian Office Action for the related Indian Patent Application No. 202217001049 dated May 10, 2022.
The International Search Report and Written Opinion for PCT/JP2020/023239 dated Jul. 21, 2020.

* cited by examiner

SCREEN IMAGE TRANSITION INFORMATION GENERATION DEVICE, SCREEN IMAGE TRANSITION INFORMATION GENERATION METHOD, SCREEN IMAGE TRANSITION INFORMATION GENERATION PROGRAM, AND SCREEN IMAGE TRANSITION INFORMATION GENERATION SYSTEM

This application is a U.S. National Stage Application under 35 U.S.C § 371 of International Patent Application No. PCT/JP2020/023239 filed Jun. 12, 2020, which claims the benefit of priority to Japanese Patent Application No. 2019-130016 filed Jul. 12, 2019, the disclosures of all of which are hereby incorporated by reference in their entireties.

TECHNICAL FIELD

The present invention relates to a technique for generating data for verifying screen image transition when an operation target element such as a button or an icon on a screen image displayed on a display is operated.

BACKGROUND ART

Conventionally, as a method of verifying whether screen image transition of a developed computer system is as designed, for example, manually clicking or tapping each operation target element such as a button or an icon displayed on a screen image has been performed, and the screen image of the transition destination was sequentially and manually recorded. In such a method, a great deal of labor and manual intervention has been required.

As a method for automatically generating a screen image transition diagram, for example, Patent Document 1 describes a system which generates a screen image transition diagram by further analyzing a computer system program with an analysis program.

PRIOR ART DOCUMENT

Patent Document

Patent Document 1: Japanese Patent Application Laid-Open No. 2008-140408

SUMMARY OF THE INVENTION

Problems to be Solved by the Invention

However, even if the system described in Patent Document 1 is used, since there is no guarantee that the analysis program is free of bugs, verification of the analysis program is further required. As a result, there was a problem that the screen image transition could not be verified without actual manual intervention.

In a specific aspect, it is an object of the present invention to provide a technique capable of obtaining information for verifying the screen image transition without manual intervention.

Means for Solving the Problem (1) A screen image transition information generation device according to one aspect of the present invention is (a) a device for generating information related to a screen image transition caused by operation of a button which is an operation target element on a screen image displayed on a display of a subject device, the device having: (b) a screen image data acquisition unit which acquires image data of the screen image displayed on the display of the subject device; (c) a screen image transition button extraction unit which analyzes image data of the screen image acquired by the screen image data acquisition unit and extracts one or more of the buttons included in the screen image; (d) an operation target button selection unit which selects a button to be an operation target from among the buttons extracted by the screen image transition button extraction unit; (e) a button operation unit which causes the subject device to generate a signal when the button selected by the operation target button selection unit is operated; (f) a screen image transition recording unit which records screen image transition data in a recording medium, the screen image transition data including image data of the screen images before and after the screen image transition caused by the operation of the button of the subject device, and data related to the button operated during the screen image transition; and (g) a screen image transition diagram generation unit which generates a screen image transition diagram using the screen image transition data.

(2) A screen image transition information generation method according to one aspect of the present invention is (a) a method for generating information related to a screen image transition caused by operation of a button which is an operation target element on a screen image displayed on a display of a subject device, the method including: (b) a first step where a controller acquires image data of the screen image displayed on the display of the subject device; (c) a second step where the controller analyzes image data of the screen image acquired in the first step, and extracts one or more of the buttons included in the screen image; (d) a third step where the controller selects the button to be an operation target from the buttons extracted in the second step; (e) a forth step where the controller causes the subject device to generate a signal when the button selected in the third step is operated; (f) a fifth step where the controller records screen image transition data in a recording medium, the screen image transition data including image data of the screen images before and after the screen image transition caused by the operation of the button of the subject device, and data related to the button operated during the screen image transition; and (g) a sixth step where the controller generates a screen image transition diagram using the screen image transition data.

(3) A screen image transition information generation program according to one aspect of the present invention is (a) a program which causes a computer system to generate information related to a screen image transition caused by operation of a button which is an operation target element on a screen image displayed on a display of a subject device, the program causing the computer system to execute: (b) a first step which acquires image data of the screen image displayed on the display of the subject device; (c) a second step which analyzes image data of the screen image acquired in the first step, and extracts one or more of the buttons included in the screen image; (d) a third step which selects the button to be an operation target from the buttons extracted in the second step; (e) a forth step which causes the subject device to generate a signal when the button selected in the third step is operated; (f) a fifth step which records screen image transition data in a recording medium, the screen image transition data including image data of the screen images before and after the screen image transition caused by the operation of the button of the subject device, and data related to the button operated during the screen image transition; and (g) a sixth step which generates a screen image transition diagram using the screen image transition data.

(4) A screen image transition information generation system according to one aspect of the present invention is (a) a system where the system generates information related to a screen image transition caused by operation of a button which is an operation target element on a screen image displayed on a display of a subject device, the system including: (b) a camera which captures the display; (c) a robot which operates a designated position on the screen image of the display; and (d) a controller to which the camera and the robot are connected; (e) where the screen image transition information generation device in the above-described (1) is used as the controller.

Here, in the present specification, an image to be displayed on a display (display means) is defined as a "screen image", and an operation target element such as a button, an icon, or a character string displayed on the screen image is collectively defined as "buttons".

According to the above configurations, image data of the screen image currently displayed on the display is analyzed to extract the buttons which are the operation target elements, and the button to be the operation target is selected from among the buttons and being operated, so that screen image transition can be verified without manual intervention.

MODE FOR CARRYING OUT THE INVENTION

Figure 1:
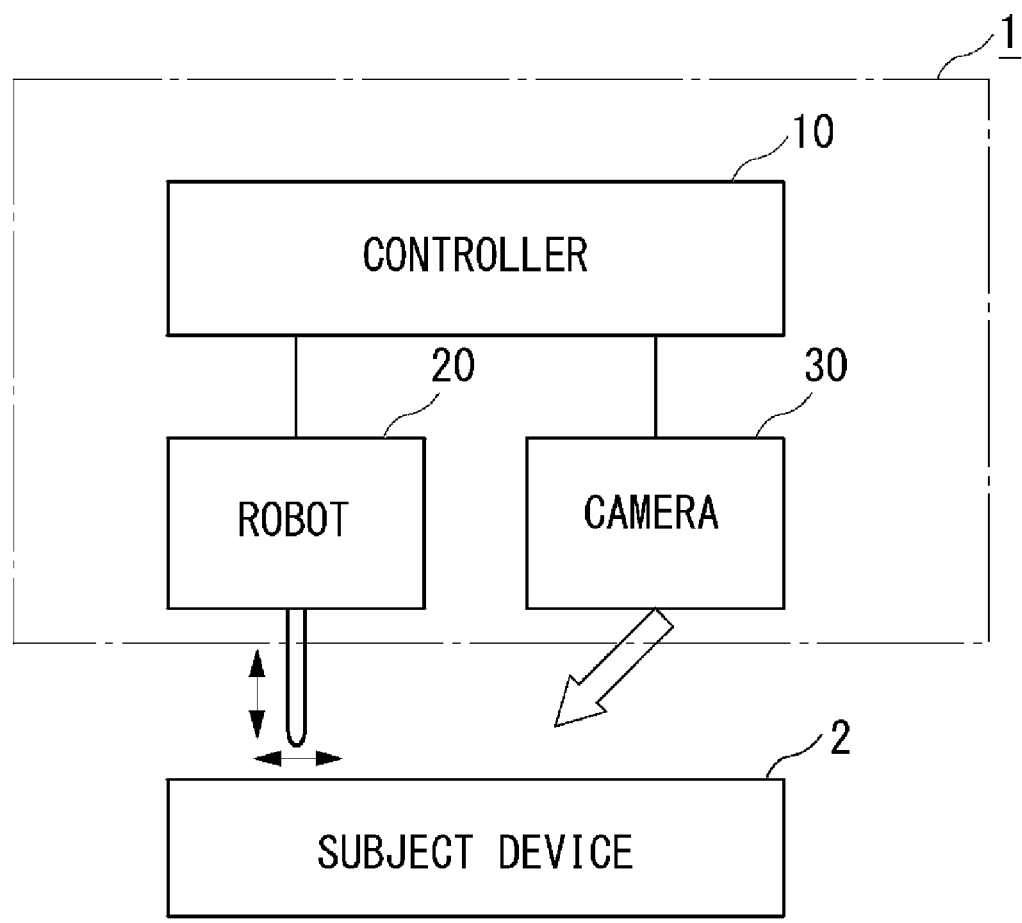
FIG. 1 is a diagram showing an overall configuration of a screen image transition information generation system 1 according to one embodiment.

FIG. 1 is a diagram showing an overall configuration of a screen image transition information generation system 1 according to one embodiment. The screen image transition information generation system 1 generates data for verifying the transition state of various screen images displayed on the display of the subject device 2, which is the target for generating screen image transition information, and the system is configured to include a controller (a screen image transition information generation device) 10, a robot 20 for operating a tap or the like on the display of the subject device 2, and a camera 30 for capturing a screen image displayed on the display of the subject device 2.

Here, the subject device 2 in the present embodiment is a device such as a smart-phone, a tablet terminal, a car navigation device, where operation can be performed via a touch panel provided on a display, and various screen images are displayed on the display in response to the operation. For example, in the case of a smart-phone, by operating and inputting via the touch panel, it is possible to operate pre-installed application software to execute various information processing (for example, sending and receiving e-mails) and during that time, the screen image displayed on the display is occasionally switched and displayed by the application software. Further, for example, in the case of a car navigation device, by operating and inputting via the touch panel, it is possible to operate pre-installed software to execute information processing such as route search, and during that time, the screen image displayed on the display is occasionally switched and displayed by the application software.

Figure 2:
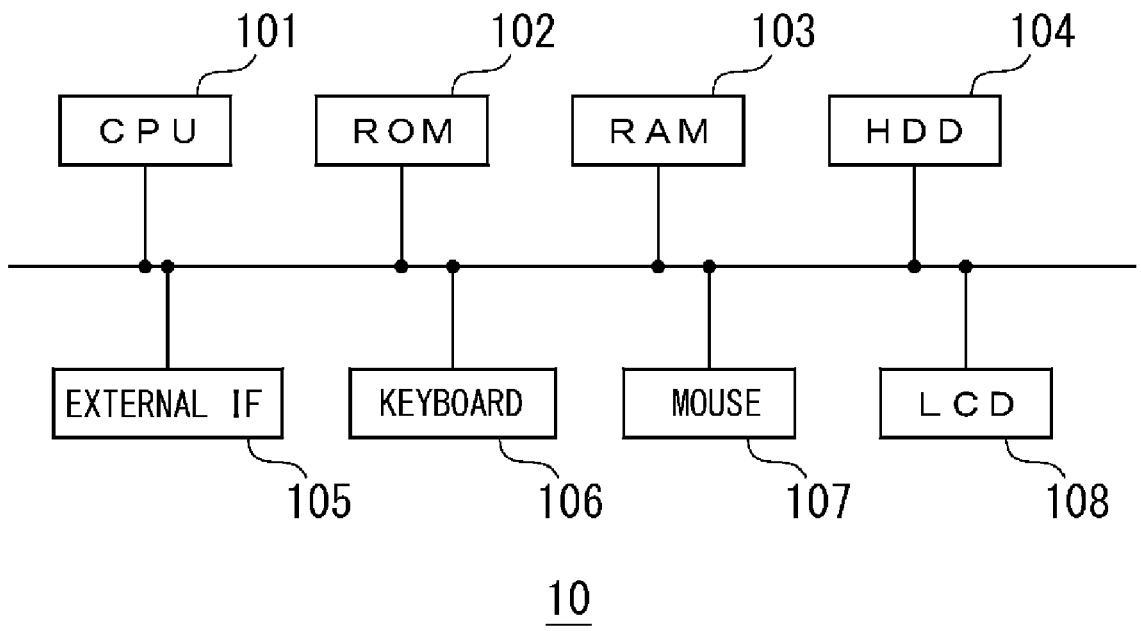
FIG. 2 is a diagram showing an example of a computer system for configuring a controller.

The controller 10 is configured by using a computer system including, for example, a CPU, a RAM, a ROM, a large capacity storage device, a communication interface, and the like. FIG. 2 shows an example of a computer system for configuring the controller. The illustrated computer system is configured to include a CPU (central processing unit) 101, a ROM (read-only memory) 102, a RAM (random access memory) 103, a HDD (hard disk drive) 104, an external IF (interface) 105, a keyboard 106, a mouse 107, and an LCD (liquid crystal display device) 108. These CPU 101 and the like are connected to each other by a bus. The CPU 101 performs information processing by executing a program. The ROM 102 stores a basic control program or the like necessary for the operation of the CPU 101. The RAM 103 temporarily stores data necessary for the CPU 101 to perform information processing. The controller 10 described above is configured by these components. The HDD 104 is a large capacity storage device for storing data, and stores application programs, data, and the like for realizing each function of the above-described controller 10.

Figure 3:
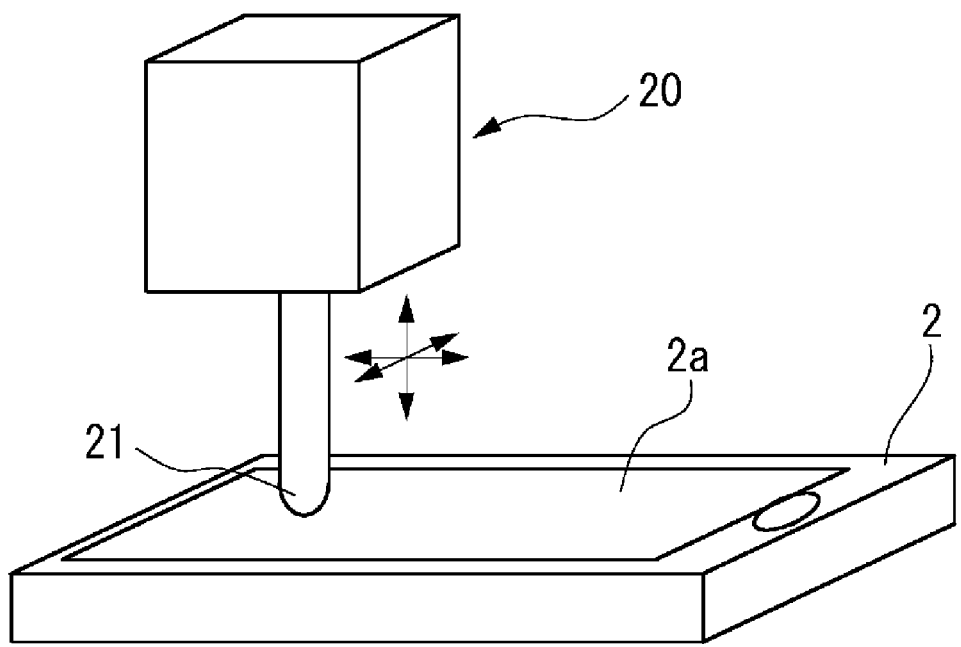
FIG. 3 is a schematic view of the robot 20.

The robot 20 is capable of operating an arm by receiving an operation command from the controller 10 in order to operate an operation target element such as a button or an icon on the screen displayed on the display of the subject device 2. Here, the present embodiment will be described on the premise that tapping, which is a touch operation of the display surface, is defined as an "operation". As shown in a schematic diagram of the robot 20 in FIG. 3, the robot 20 of the present embodiment is configured to have a pressing part 21 which can freely move at least in three axial directions, and the pressing part 21 can tap an arbitrary point on the display 2a of the subject device 2. Here, it should be noted that such robot 20 is publicly known as an industrial robot or the like.

The camera 30 captures a screen image displayed on the display 2a of the subject device 2 and outputs its image data to the controller 10. The camera 30 may be integrally configured with the robot 20.

Figure 4:
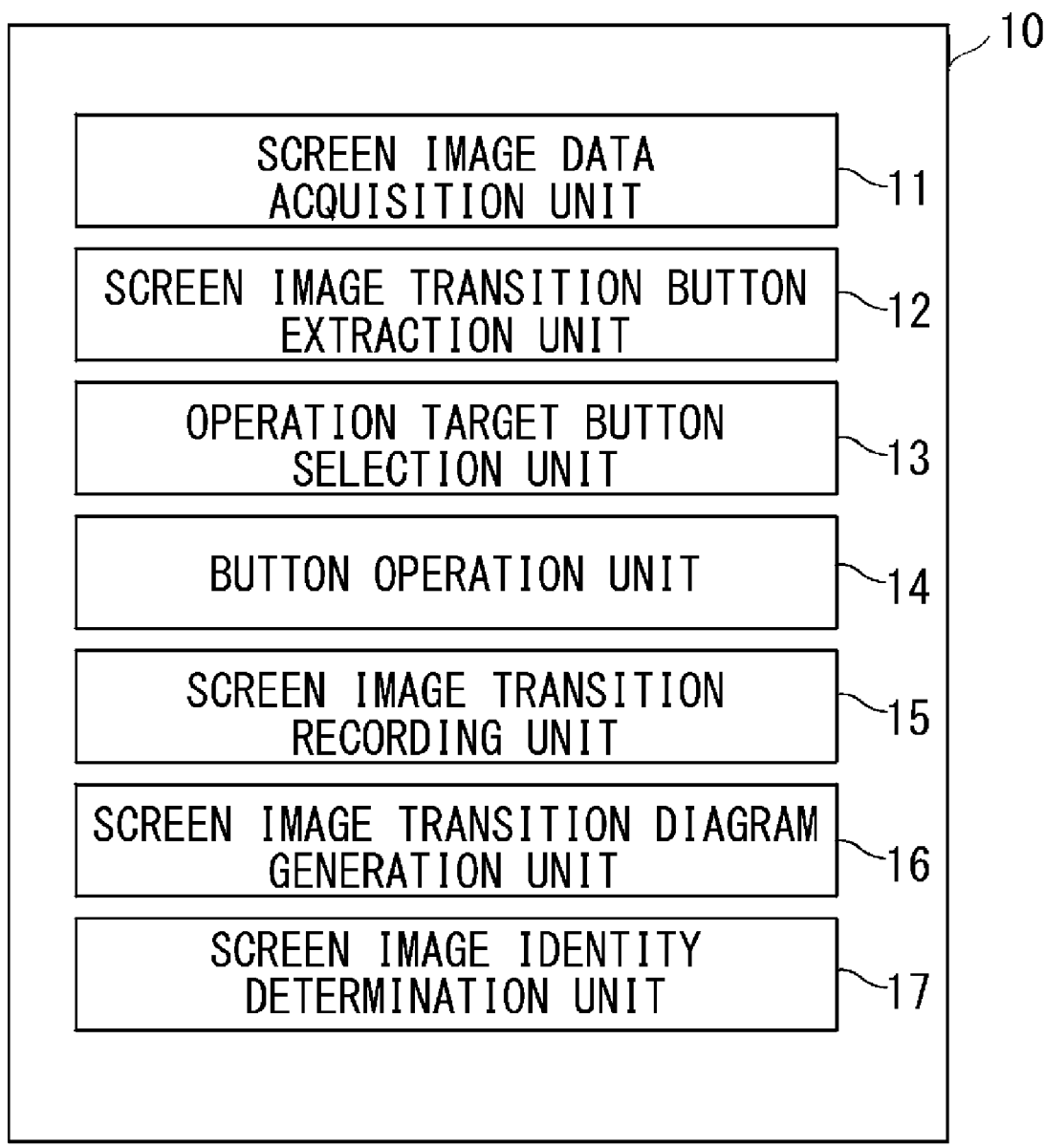
FIG. 4 is a block diagram showing a functional configuration of the controller 10.

FIG. 4 is a block diagram showing a functional configuration of the controller 10. These functions are realized by having the CPU 101 of the controller 10 read the programs stored in the HDD 104 and execute the programs. As shown in the figure, the controller 10 is configured to include a screen image data acquisition unit 11, a screen image transition button extraction unit 12, an operation target button selection unit 13, a button operation unit 14, a screen image transition recording unit 15, a screen image transition diagram generation unit 16, and a screen image identity determination unit 17.

The screen image data acquisition unit 11 acquires image data of the screen image currently displayed on the display 2a of the subject device 2 from the camera 30.

The screen image transition button extraction unit 12 analyzes image data acquired by the screen image data acquisition unit 11 by a publicly known image recognition process, and extracts an operation target element such as a button, an icon, or a character string which are display elements on the screen image. The operation target element extracted here is an image element expected to cause screen image transition when it is operated. Here, as described above, in the present specification, the operation target elements such as a button, an icon, or a character string are collectively defined as "buttons".

As the button extraction method described above, an arbitrary rule may be used. For example, the screen image transition button extraction unit 12 recognizes a region surrounded by a circle or a rectangular frame, a region having a different color or pattern from the surrounding region, and the like as a region in which a button which is expected to cause screen image transition when an operation is performed, and extracts image data of the region and its position coordinate (for example, the center point coordinate of the screen image).

The operation target button selection unit 13 selects a button to be operated by the robot 20 from one or more of the buttons extracted by the screen image transition button extraction unit 12.

The button operation unit 14 performs control of the operation of the button by the robot 20, the button which is intended to be the current operation target selected by the operation target button selection unit 13. Specifically, the button operation unit 14 transmits to the robot 20 an operation command including the screen image position coordinate of the button intended to be the operation target. When the robot 20 receives the operation command from the button operation unit 14 of the controller 10, the robot 20 taps the button displayed at a position represented by the position coordinate included in the operation command, the button being one of the plurality of buttons on the screen image displayed on the display 2a of the subject device 2.

The screen image transition recording unit 15 records the screen image transition data representing the result of the screen image transition by the operation of the button operation unit 14 in the HDD 104 of the controller 10. Specifically, the screen image transition recording unit 15 records image data of the screen images before and after the transition, image data and position coordinates of the buttons extracted from the screen images, image data and position coordinate of the button selected as the operation target, and the like, in the HDD 104, for example.

Figure 5:
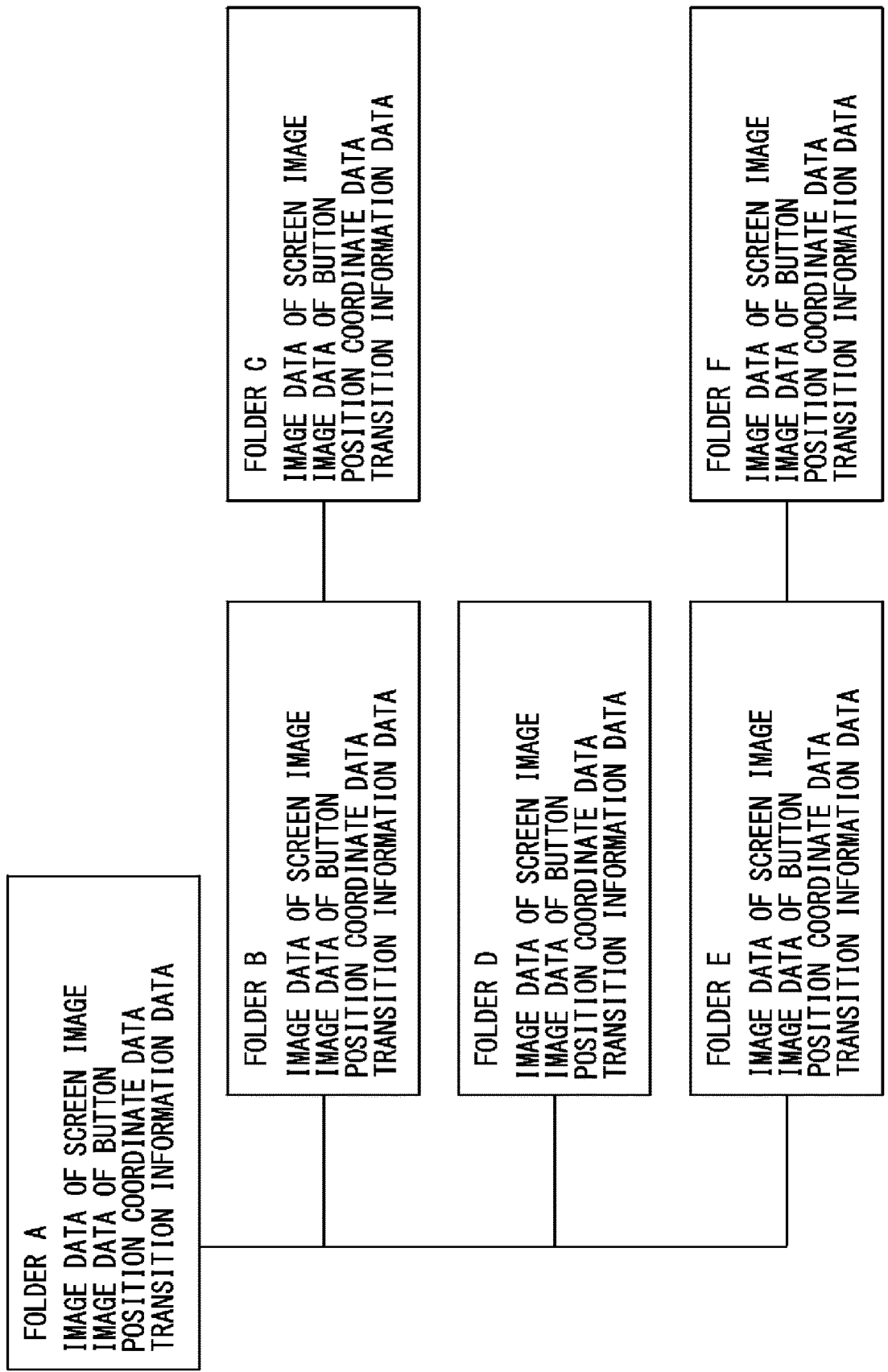
FIG. 5 is a diagram showing an example of a structure of screen image transition data recorded by the screen image transition recording unit 15.

FIG. 5 is a diagram showing an example of a structure of screen image transition data recorded by the screen image transition recording unit 15. For example, folder A is a folder in which data related to a screen image A is accumulated, and in the folder, transition information data associated with the screen image A, such as image data of the screen image A, image data and position coordinates of the buttons extracted from the screen image A, image data and position coordinate of the button selected as the operation target and the like, are recorded. The same applies to other folders.

Further, folders B, D, and E are associated with the folder A as sub-folders, whereby the transition route is shown. In this example, it is shown that, by operating a predetermined button on the screen image A, transition to each of a screen image B, a screen image D, and a screen image E is executed, and by operating a predetermined button on the screen image B, transition to a screen image C is executed, and by operating a predetermined button on the screen image E, transition to a screen image F is executed.

The screen image transition diagram generation unit 16 generates a screen transition diagram based on the screen image transition data recorded by the screen image transition recording unit 15. The generated screen transition diagram is recorded in the HDD 104 and displayed on the LCD 108 as appropriate.

The screen image identity determination unit 17 compares image data recorded by the screen image transition recording unit 15, thereby determines whether the screen image regarded as being the same as the screen image currently displayed on the display 2a of the subject device 2 has already been displayed during the process of the transition route taken so far. As a method of determining whether or not the screen images are the same, any publicly known art may be used. For example, the pixels of the image data are compared with each other, and when the pixels having a predetermined ratio (for example, 90%) or more coincide with each other, it can be determined that the screen images are the same. Since the screen images before and after the transition may not completely match due to changes in some elements (for example, time display may differ), in the present embodiment, both screen images are regarded as being the same if they are similar enough so as to meet or exceed a certain standard.

Figure 6A:
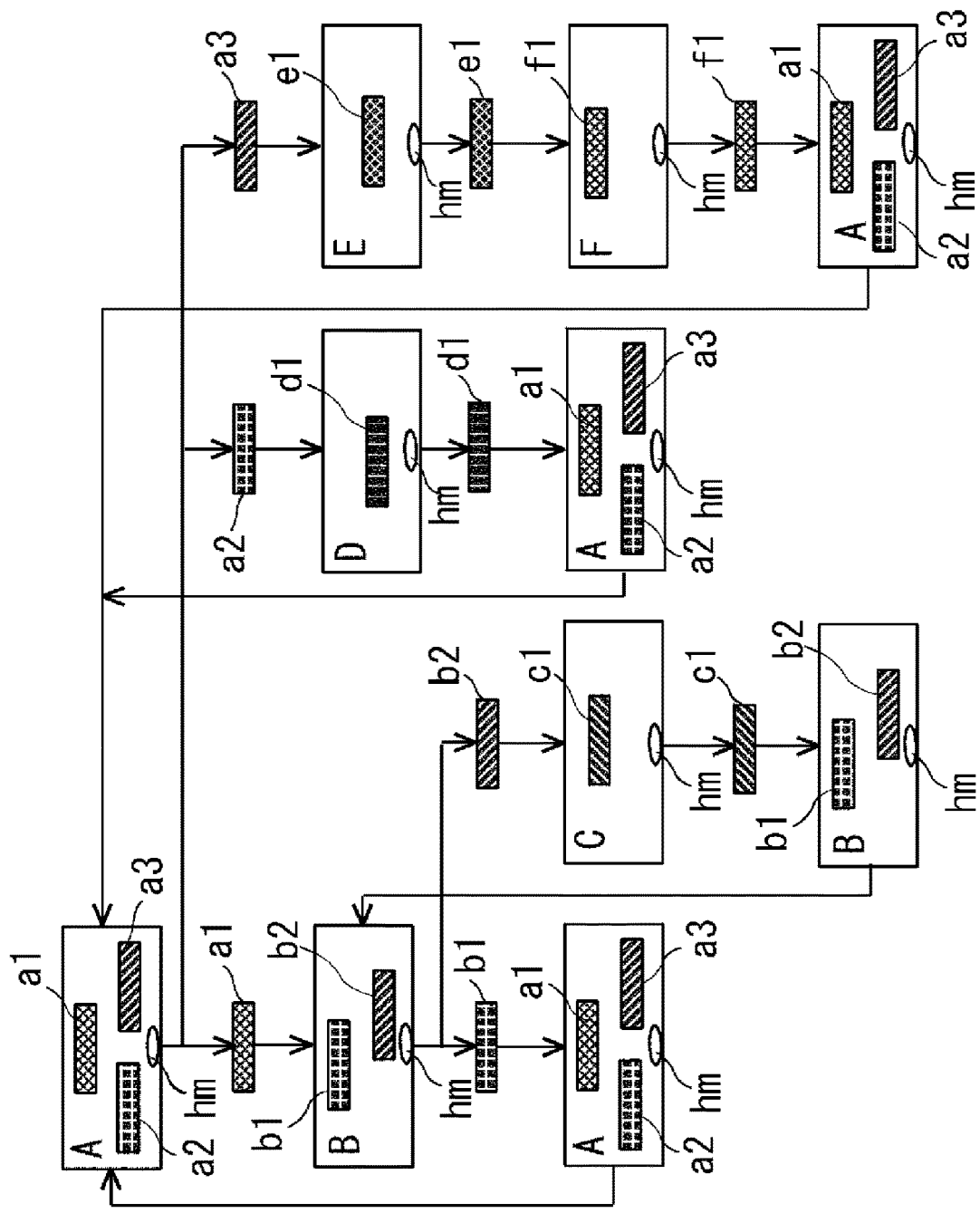
FIG. 6A is a diagram showing an example of a screen image transition diagram.
Figure 6B:
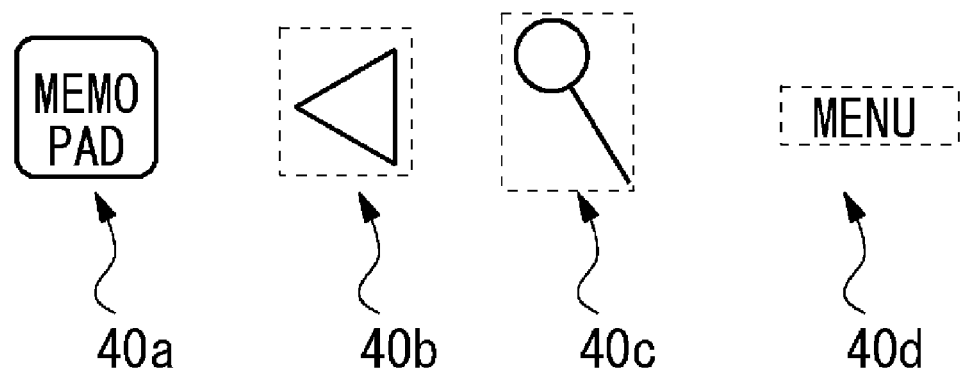
FIG. 6B is a diagram showing an example of buttons included in the screen image transition diagram.

FIG. 6A is a diagram showing an example of a screen image transition diagram. When all the operations of the buttons on the transition route from the screen image A which is the home screen image are completed, the screen image transition diagram is generated by using the data accumulated up to that point. By displaying the screen image transition diagram on the LCD 108 or printing it out with a printer which is not shown, a user can verify the contents of the overall screen image transition. Further, the screen image transition diagram may be displayed in the middle of the operation so that it can be confirmed how far the operation has been completed. FIG. 6B is a diagram showing an example of buttons included in the screen image transition diagram. The screen image transition diagram includes various operation target elements such as an application software icon 40a, a graphic button 40b indicating a specific function, a symbol button 40c also indicating a specific function, or a character string 40d also indicating a specific function. As described above, these are collectively referred to as "buttons" in the present specification.

In the screen image transition diagram of the present embodiment shown in FIG. 6A, in a situation where a transition from a certain screen image to another screen image is indicated, arrow images indicating the transition direction are arranged between the images of each screen image in order to indicate the connection of the screen images, and image of a button which has become the trigger of transition is arranged between each of the screen images. For example, between the screen images of the screen image A and the screen image B, an image of a button a1 which triggers the transition is shown. In this way, by showing image of arrows and a button indicating the transition direction between each of the screen images, it becomes easier to grasp the state of the screen image transition.

Figure 7:
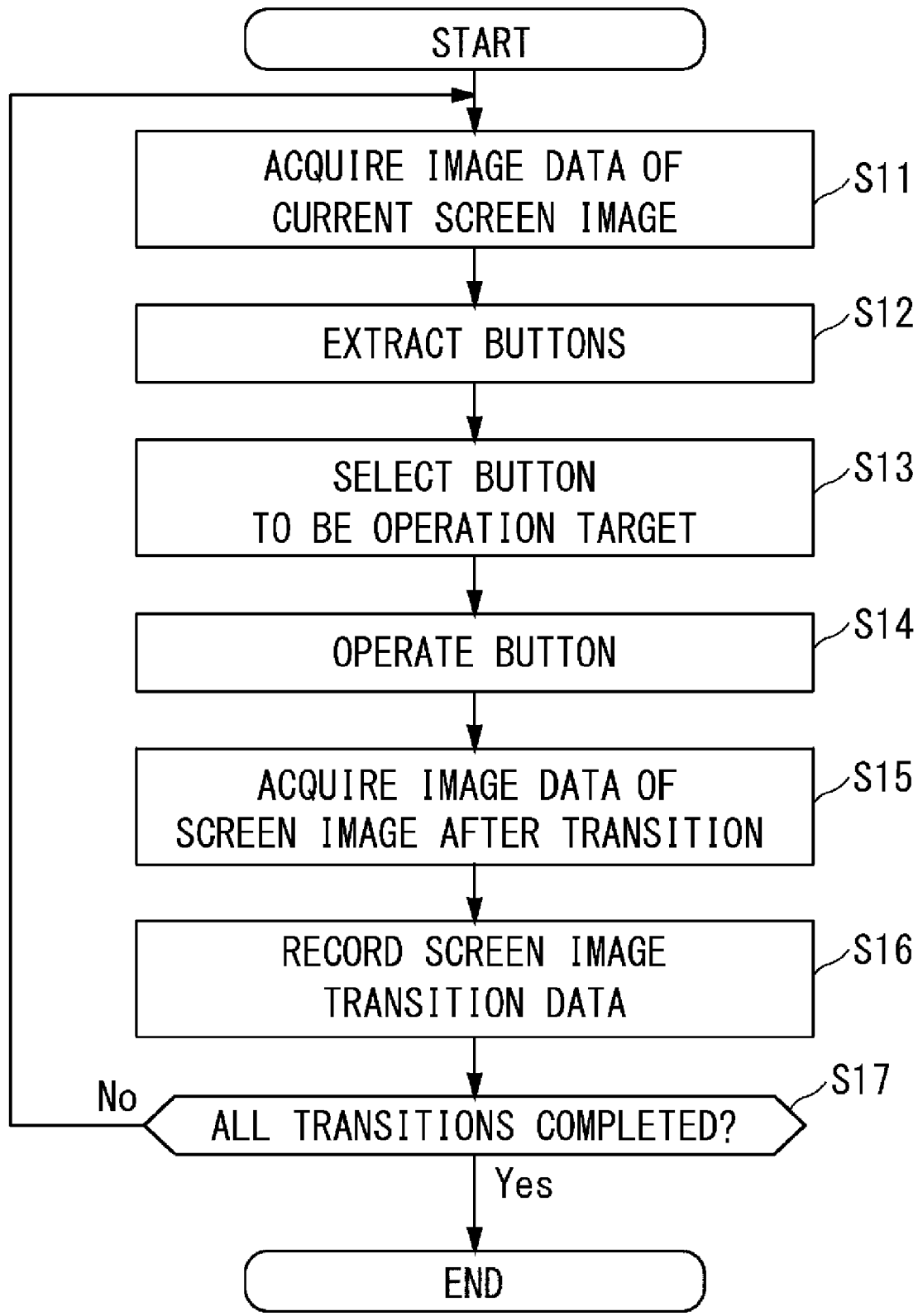
FIG. 7 is a flowchart for explaining an operation of screen image transition verification processing performed by the screen image transition information generation system 1.

FIG. 7 is a flowchart for explaining an operation of screen image transition verification processing performed by the screen image transition information generation system 1. Here, with regard to each step process, the order thereof may be appropriately changed as long as no inconsistency occurs in the result of the information processing, and other processes may further be added. Here, as a preparation for performing the following process, position coordinate of the home button hm which is commonly displayed on all screen images are manually set in advance, and the screen image A is set as a home screen image which is the transition destination when the home button hm is pressed, and these settings are recorded in the HDD 104. Here, as for the operation of returning to the home screen image, in addition to the home button hm set on the illustrated screen image, a hardware button or a specific operation may be considered. In these cases, the position of the hardware button may be set in advance, or a specific operation may be set in advance.

The screen image data acquisition unit 11 of the controller 10 acquires image data of the screen image currently displayed on the display 2a of the subject device 2 (step S11). The screen image transition button extraction unit 12 analyzes the image data acquired by the screen image data acquisition unit 11, and extracts one or more buttons expected to cause screen image transition when operated, from among the buttons on the screen image (step S12).

The operation target button selection unit 13 selects a button to be the current operation target from each button extracted by the screen image transition button extraction unit 12 (step S13), and transmits to the robot 20 an operation command which instructs the operation of the button. When the robot 20 receives the operation command from the controller 10, the robot 20 taps a button designated by the operation command among the buttons on the screen image displayed on the display 2a of the subject device 2 (step S14).

The screen image data acquisition unit 11 of the controller 10 acquires image data of the screen image after the transition has taken place from the subject device 2 (step S15). The screen image transition recording unit 15 records the image data before and after the screen image transition, image data and position coordinate of the operation target button, etc., screen image transition data which shows the result of the screen image transition, in the HDD 104, (step S16).

The screen image data acquisition unit 11 determines whether or not the recording of the transition of all screen images is completed (step S17), and if the recording of the transition of all screen images is not completed (NO in step S17), then returns to step S11. If the recording of the transition of all screen images is completed (YES in step S17), then the controller 10 completes the series of processes. Specifically, in step S17, for example, when the screen image after the transition has taken place is the screen image A which is the home screen image, and when all the buttons on the transition route as well as all the buttons on the screen image A have already been operated, then it can be determined that the recording of the transition of all the screen images has been completed.

Figure 8:
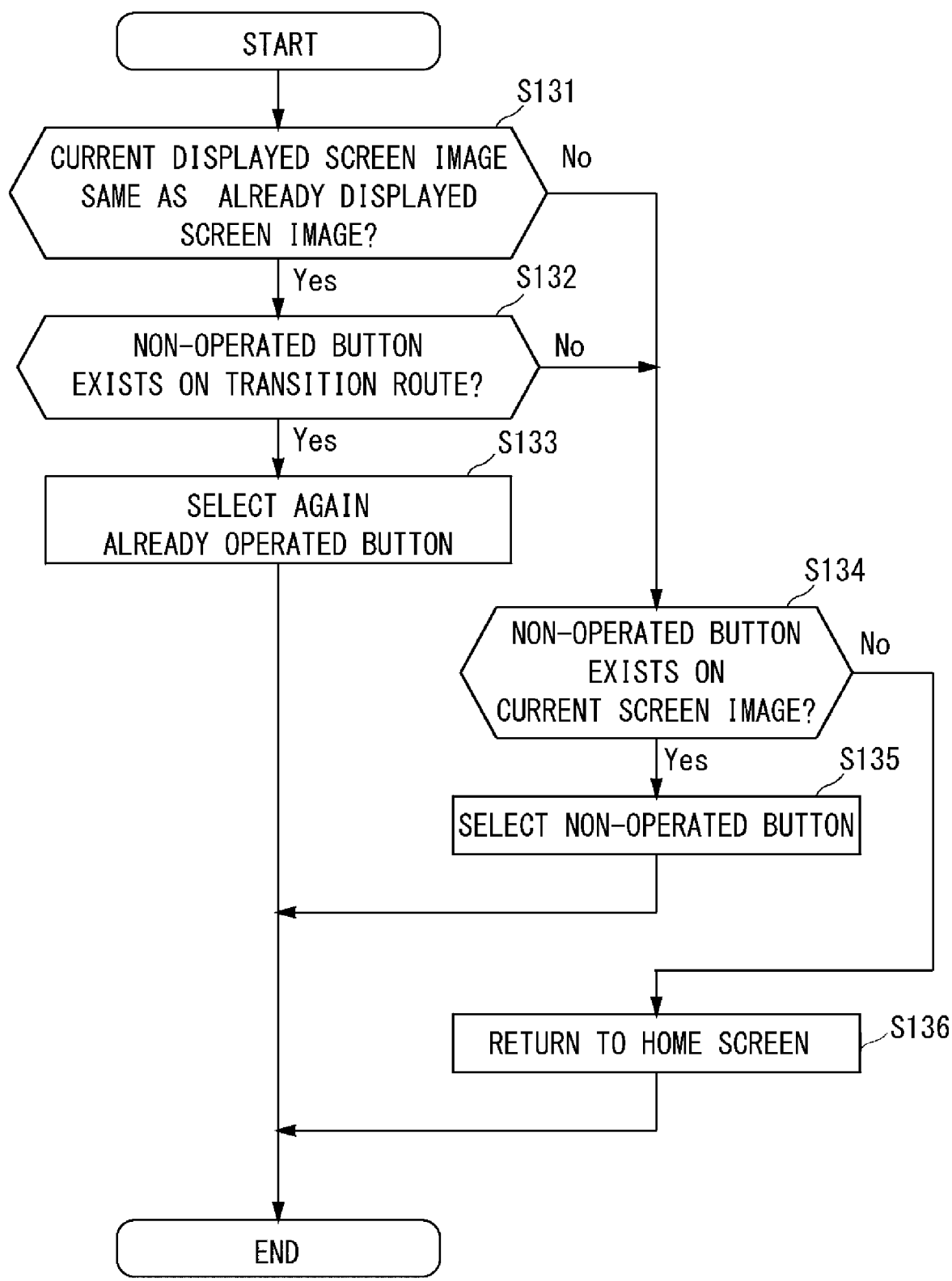
FIG. 8 is a flowchart for explaining a procedure of selection processing of the operation target button in step S13 shown in FIG. 7.

FIG. 8 is a flowchart for explaining a procedure of selection processing of the operation target button in step S13 shown in FIG. 7. Here, with regard to each step process, the order thereof may be appropriately changed as long as no inconsistency occurs in the result of the information processing, and other processes may further be added.

In response to instruction from the operation target button selection unit 13, the screen image identity determination unit 17 determines whether or not the screen image currently displayed on the display 2a of the subject device 2 is the same as the screen image already displayed during the process of the transition route taken so far (already displayed screen images) (step S131).

If it is determined that the current screen image is the same as one of the already displayed screen images (YES in step S131), then the operation target button selection unit 13 determines whether or not there exists a non-operated button on the screen images of lower-order transition route which transitions from the already operated button on the screen image (step S132).

If it is determined that there exists a non-operated button (YES in step S132), then in order to display again the screen image corresponding to this non-operated button, the previously already operated button on the already displayed screen images is selected again as the current operation target (step S133).

On the other hand, if it is determined in step S132 that there does not exist a non-operated button on the screen images of the low-order transition route of the already operated button (NO in step S132), then it is determined whether or not there is a non-operated button on the currently displayed screen image (step S134), and if it is determined that there exists a non-operated button (YES in step S134), then the operation target button selection unit 13 selects one of the non-operated buttons as the current operation target (step S135).

On the other hand, if it is determined in step S134 that there does not exist a non-operated button (NO in step S134), then the operation returns to the home screen by the operation of returning to the home screen image (step S136).

Specifically, as described above, the home button hm registered in advance is operated, and the process of returning to the screen image A which is the home screen image, is performed.

Next, a specific example of the operation of recording screen image transition will be described with reference to the screen image transition diagram shown in FIG. 6A. Here, only the main flow will be described, and detailed description according to the flowchart will be omitted. As a premise, the screen image A is the home screen image, and as shown in FIG. 6A, operating the button a1 on the screen image A transitions to a screen image B, operating a button a2 transitions to a screen image D, and operating a button a3 transitions to a screen image E. Further, the screen image B is a screen image which transitions from the screen image A, and when the button b1 on the screen image B is operated, the screen image B transitions to the screen image A, and when the button b2 is operated, the screen image B transitions to the screen image C. The screen image C is a screen image which transitions from the screen image B, and when the button c1 on the screen image C is operated, the screen image C transitions to the screen image B. The screen image D is a screen image which transitions from the screen image A, and when a button d1 on the screen image D is operated, the screen image D transitions to the screen image A. The screen image E is a screen image which transitions from the screen image A, and when a button e1 on the screen image E is operated, the screen image E transitions to a screen image F. The screen image F is a screen image which transitions from the screen image E, and when a button f1 on the screen image F is operated, the screen image F transitions to the screen image A.

First, as an initial setting, the screen image A being the home screen is displayed on the display 2a of the subject device 2. The screen image data acquisition unit 11 acquires image data of the screen image A currently displayed on the display 2a of the subject device 2. The screen image transition button extraction unit 12 analyzes image data of the screen image A, and extracts position coordinates and images of the buttons a1, a2, and a3, which are expected to cause a screen image transition when operated (hereinafter, referred to as "operation target candidate buttons"). At this point, since the button a1 has not been operated yet, the operation target button selection unit 13 selects the button a1 as the operation target button, and the button operation unit 14 transmits to the robot 20 an operation command which includes position coordinate of the button a1. Accordingly, the robot 20 taps the button a1 on the screen image A displayed on the subject device 2.

As a result of the tapping operation of the button a1, the screen image A transitions to the screen image B. Since the transition to the screen image B has occurred, the screen image transition button extraction unit 12 analyzes image data of the screen image B and extracts position coordinates and screen images of the buttons b1 and b2, which are the operation target candidate buttons. Since the button b1 has not been operated yet, the operation target button selection unit 13 selects the button b1 as the operation target button, and the robot 20 taps the button b1 on the screen image B.

As a result of the tapping operation of the button b1, the screen image B transitions to the screen image A. Since the transition to the screen image A has occurred, the screen image transition button extraction unit 12 analyzes image data of the screen image A and extracts position coordinates and images of the buttons a1, a2, and a3, which are the operation target candidate buttons.

Further, the screen image identity determination unit 17 refers to the screen image transition data recorded by the screen image transition recording unit 15, and determines that the screen image A currently displayed on the display 2a of the subject device 2 is the same screen image as the screen image A displayed during the process of the transition route taken so far.

In this case, since the button b2 (which differs from the button b1) on the screen image B has not been operated yet, in order to display the screen image B again, the operation target button selection unit 13 selects the button a1 again as the operation target button. The robot 20 taps the button a1 on the screen image A.

As a result of the tapping operation of the button a1, the screen image A transitions to the screen image B, and the screen image transition button extraction unit 12 analyzes image data of the screen image B, and extracts position coordinates and the images of the buttons b1, and b2, which are the operation target candidate buttons. At this point, since the button b2 has not been operated yet, the button b2 is selected as the operation target coordinate, and the button b2 on the screen image B is tapped by the robot 20.

As a result of the tapping operation of the button b2, the screen image B transitions to the screen image C. Since the transition to the screen image C has occurred, the screen image transition button extraction unit 12 analyzes image data of the screen image C, and extracts position coordinate and the image of the button c1, which is the operation target candidate button. At this point, since the button c1 has not been operated yet, the button c1 is selected as the operation target button, and the button c1 on the screen image C is tapped by the robot 20.

As a result, the screen image transitions to the screen image B. Since the transition to the screen image B has occurred, the screen image transition button extraction unit 12 analyzes image data of the screen image B, and extracts position coordinates and the images of the buttons b1 and b2, which are the operation target candidate buttons.

Here, the screen image identity determination unit 17 determines that the screen image B currently displayed on the display of the subject device 2 is the same screen image as the screen image B already displayed during the process of the transition route taken so far. Further, since the buttons b1, b2 on the screen image B and the button c1 on the screen image C which is further along the transition route of the screen image B are all operated, by the operation of returning to the home screen image (by the operation of the home button hm), the screen image returns to the screen image A which is the home screen image.

Consequently, since the transition to the screen image A has occurred, the screen image transition button extraction unit 12 analyzes image data of the screen image A and extracts position coordinates and the images of the buttons a1, a2, and a3, which are the operation target candidate buttons. At this point, since the button a2 has not been operated yet, the button a2 is selected as the operation target button, and the button a2 on the screen image A is tapped by the robot 20.

Consequently, since the transition to the screen image D has occurred, the screen image transition button extraction unit 12 analyzes image data of the screen image D and extracts position coordinate and the image of the button d1, which is the operation target candidate button. At this point, since the button d1 has not been operated yet, the operation target button selection unit 13 selects the button d1 as the operation target button. The robot 20 taps the button d1 on the screen image D.

Consequently, since the transition to the screen image A has occurred, the screen image transition button extraction unit 12 analyzes image data of the screen image A and extracts position coordinates and the images of the buttons a1, a2, and a3, which are the operation target candidate buttons.

Further, the screen image identity determination unit 17 determines that this screen image A is the same screen image as the screen image A already displayed during the process of the transition route taken so far. Further, with regard to buttons a1 and a2 which have already been the operation targets, since all the displayed buttons during the process of the transition route have been operated, the operation target button selection unit 13 selects the button a3 as the current operation target button. The robot 20 taps the button a3 on the screen image A.

Consequently, since the transition to the screen image E has occurred, the screen image transition button extraction unit 12 analyzes image data of the screen image E and extracts position coordinate and the image of the button el, which is the operation target candidate button. At this point, since the button el has not been operated yet, the operation target button selection unit 13 selects the button el as the operation target button. The robot 20 taps the button el on the screen image E.

Consequently, since the transition to the screen image F has occurred, the screen image transition button extraction unit 12 analyzes image data of the screen image F and extracts position coordinate and the image of the button f1, which is the operation target candidate button. At this point, since the button f1 has not been operated yet, the operation target button selection unit 13 selects the button f1 as the operation target button. The robot 20 taps the button f1 on the screen image F.

Consequently, since the transition to the screen image A has occurred, the screen image transition button extraction unit 12 analyzes image data of the screen image A and extracts position coordinates and the images of the buttons a1, a2, and a3, which are the operation target candidate buttons.

Further, the screen image identity determination unit 17 determines that this screen image A is the same screen image as the screen image A already displayed during the process of the transition route taken so far. Since all the buttons on the transition route have been tapped and all the buttons on the screen image A have been tapped, the recording of all transitions is completed.

When the process is completed, the screen image transition diagram generation unit 16 generates a screen image transition diagram as shown in FIG. 6A by using the data in the HDD 104 recorded by the screen image transition recording unit 15, and records the data of the screen image transition diagram in the HDD 104, and displays it on the LCD 108.

As described above, since the screen image transition information generation system 1 analyzes image data of the screen image currently displayed on the display of the subject device 2 to extract the operation target candidate buttons, selects the operation target button from among the operation target candidate buttons, transmits an operation command to the robot 20, and the robot 20 operates the button on the screen image, manual operation is not required and labor and manual intervention can be eliminated. Further, since it is not necessary to generate an operation scenario in advance, it is possible to eliminate labor and manual intervention for generating an operation scenario. Further, since the data representing the screen image transition result can be accumulated, and a screen image transition diagram can be generated based on the data and can be displayed or printed out, the contents of the screen image transition can be easily verified.

Here, it should be noted that the above-described embodiment is merely an example, and various modifications can be made within the scope of the gist of the present invention. The device configuration and data configuration of the screen image transition information generation system 1 in the above-described embodiment are merely an example. Further, the screen image transition data representing the result of the screen image transition is not limited to the folder structure described above, and various data structures such as simply accumulating data in time series can be considered.

Further, in the above-described embodiment, image data of the screen image of the subject device 2 is captured by the camera 30 and taken into the controller 10, but the controller 10 and the subject device 2 may be mutually connected by a signal cable (or wireless communication means), and the screen image data acquisition unit 11 of the controller 10 may be configured so as to have the controller 10 directly capture the image data obtained by capturing the screen image of the display 2a.

Further, in the above-described embodiment, the operation toward the display 2a of the subject device 2 is performed by the robot 20, but the system may be configured so that the controller 10 and the subject device 2 are connected to each other by a signal cable (or wireless communication means) and have the subject device 2 generate a signal which corresponds to the operation toward the display 2a. In this case, a signal may be directly (internally) transmitted from the controller 10 to the subject device 2, and the button operation unit 14 of the controller 10 may be configured so as to generate a signal corresponding to the operation to the button of the display 2a.

DESCRIPTION OF REFERENCE NUMERALS

1: Screen image transition information generation system
2: Subject device
2a: Display
10: Controller
11: Screen image data acquisition unit
12: Screen image transition button extraction unit
13: Operation target button selection unit
14: Button operation unit
15: Screen image transition recording unit
16: Screen image transition diagram generation unit
17: Screen image identity determination unit
20: Robot
30: Camera

What is claimed is:

1. A screen image transition information generation device for generating information related to a screen image transition caused by operation of a button which is an operation target element on a screen image displayed on a display of a subject device, the device comprising:
   a controller that includes;
      a screen image data acquisition portion of the controller which acquires image data of the screen image displayed on the display of the subject device, the image data of the screen image being obtained by photographing the screen with a camera or capturing the screen with the subject device;
      a screen image transition button extraction portion of the controller which analyzes image data of the screen image acquired by the screen image data acquisition portion of the controller by image recognition process and extracts one or more of the buttons included in the screen image;
      an operation target button selection portion of the controller which selects a button to be an operation target from among the one or more buttons extracted by the screen image transition button extraction portion of the controller;
      a button operation portion of the controller which causes the subject device to generate a signal when the button selected by the operation target button selection portion of the controller is operated;
      a screen image transition recording portion of the controller which records screen image transition data in a recording medium, the screen image transition data including image data of the screen images before and after the screen image transition caused by the operation of the button of the subject device, and data related to the button operated during the screen image transition; and
      a screen image transition diagram generation portion of the controller which generates a screen image transition diagram using the screen image transition data;
      a screen image identity determination portion of the controller which determines whether or not the screen image currently displayed on the display is substantially the same as the screen image already displayed in a previous screen transition,
      wherein the screen image identity determination portion of the controller determines that, even if the screen image currently displayed on the display and the screen image already displayed in the previous screen transition are not completely the same, if they are similar enough so as to meet or exceed a certain standard, they are determined to be the same;

wherein, when the screen image identity determination portion of the controller determines that the currently displayed screen image is not the same as the screen image already displayed in the previous screen transition, the operation target button selection portion of the controller selects one of the buttons on the currently displayed screen image which has not yet been selected as the operation target; and wherein, when the screen image identity determination portion of the controller determines that the currently displayed screen image is substantially the same as the screen image already displayed in the previous screen transition and when a non-operated button exists on the screen image of the screen image transition destination by the button already selected as the operation target among buttons displayed on the currently displayed screen image, the operation target button selection portion of the controller selects one of the buttons which has already been operated as the operation target.

2. The screen image transition information generation device according to claim 1, wherein the screen image transition button extraction portion of the controller generates image data of the button from image data of the screen image, and the screen image transition recording portion of the controller records the generated image data of the button as data related to the button, and wherein the screen image transition diagram generation portion of the controller generates the screen image transition diagram by arranging image data of the button related to the screen image transition between image data of the screen images before and after the screen image transition.

3. The screen image transition information generation device according to claim 2, wherein the screen image transition diagram generation portion of the controller generates the screen image transition diagram by arranging an arrow image indicating the direction of the screen image transition between image data of the screen images before and after the screen image transition.

4. The screen image transition information generation device according to claim 1, wherein the screen image data acquisition portion of the controller acquires image data of the screen image from a camera which captures the display of the subject device, and wherein, by controlling a robot which operates a designated location on the screen image of the display, the button operation portion of the controller causes the subject device to generate a signal when the button selected by the operation target button selection portion of the controller is operated.

5. A screen image transition information generation system wherein the system generates information related to a screen image transition caused by operation of a button which is an operation target element on a screen image displayed on a display of a subject device, the system comprising:

a camera which captures the display;
a robot which operates a designated position on the screen image of the display; and
a controller to which the camera and the robot are connected;

wherein the screen image transition information generation device according to claim 4 is used as the controller.

6. The screen image transition information generation device according to claim 1, wherein the screen image data acquisition portion of the controller completes data acquisition of the image data of the screen image when the screen image after the transition is a home screen set in advance and signals when operating all the buttons on the transition route and the buttons on the home screen have been generated by the button operation portion of the controller.

7. The screen image transition information generation device according to claim 1, wherein the buttons include at least one of an icon, a graphic button, a symbol button, and a character string.

8. A screen image transition information generation method for generating information related to a screen image transition caused by operation of a button which is an operation target element on a screen image displayed on a display of a subject device, the method comprising:

a first step wherein a controller acquires image data of the screen image displayed on the display of the subject device, the image data of the screen image being obtained by photographing the screen with a camera or capturing the screen with the subject device;

a second step wherein the controller analyzes image data of the screen image by image recognition process acquired in the first step, and extracts one or more of the buttons included in the screen image;

a third step wherein the controller selects the button to be an operation target from the one or more buttons extracted in the second step;

a fourth step wherein the controller causes the subject device to generate a signal when the button selected in the third step is operated;

a fifth step wherein the controller records screen image transition data in a recording medium, the screen image transition data including image data of the screen images before and after the screen image transition caused by the operation of the button of the subject device, and data related to the button operated during the screen image transition;

a sixth step wherein the controller generates a screen image transition diagram using the screen image transition data; and a seventh step wherein the controller determines whether or not the screen image currently displayed on the display is substantially the same as the screen image already displayed in a previous screen transition;

wherein the seventh step determines that, even if the screen image currently displayed on the display and the screen image already displayed in the previous screen transition are not completely the same, if they are similar enough so as to meet or exceed a certain standard, they are determined to be the same;

wherein, when the seventh step determines that the currently displayed screen image is not the same as the screen image already displayed in the previous screen transition, the third step selects one of the buttons on the currently displayed screen image which has not yet been selected as the operation target; and wherein, when the seventh step determines that the currently displayed screen image is substantially the same as the screen image already displayed in the previous screen transition and when a non-operated button exists on the screen image of the screen image transition destination by the button already selected as the operation target among the buttons displayed on the currently displayed screen image, the third step selects one of the buttons which has already been operated as the operation target.

9. A screen image transition information generation program which causes a computer system to generate information related to a screen image transition caused by operation of a button which is an operation target element on a screen image displayed on a display of a subject device, the program, stored on a non-transitory computer readable storage medium, causing the computer system to execute:

a first step which acquires image data of the screen image displayed on the display of the subject device, the image data of the screen image being obtained by photographing the screen with a camera or capturing the screen with the subject device;

a second step which analyzes image data of the screen image by image recognition process acquired in the first step, and extracts one or more of the buttons included in the screen image;

a third step which selects the button to be an operation target from the one or more buttons extracted in the second step;

a fourth step which causes the subject device to generate a signal when the button selected in the third step is operated;

a fifth step which records screen image transition data in a recording medium, the screen image transition data including image data of the screen images before and after the screen image transition caused by the operation of the button of the subject device, and data related to the button operated during the screen image transition;

a sixth step which generates a screen image transition diagram using the screen image transition data; and a seventh step which determines whether or not the screen image currently displayed on the display is substantially the same as the screen image already displayed in a previous screen transition;

wherein the seventh step determines that, even if the screen image currently displayed on the display and the screen image already displayed in the previous screen transition are not completely the same, if they are similar enough so as to meet or exceed a certain standard, they are determined to be the same;

wherein, when the seventh step determines that the currently displayed screen image is not the same as the screen image already displayed in the previous screen transition, the third step selects one of the buttons on the currently displayed screen image which has not yet been selected as the operation target; and wherein, when the seventh step determines that the currently displayed screen image is substantially the same as the screen image already displayed in the previous screen transition and when a non-operated button exists on the screen image of the screen image transition destination by the button already selected as the operation target among the buttons displayed on the currently displayed screen image, the third step selects one of the buttons which has already been operated as the operation target.

* * * * *